UNITED STATES PATENT OFFICE.

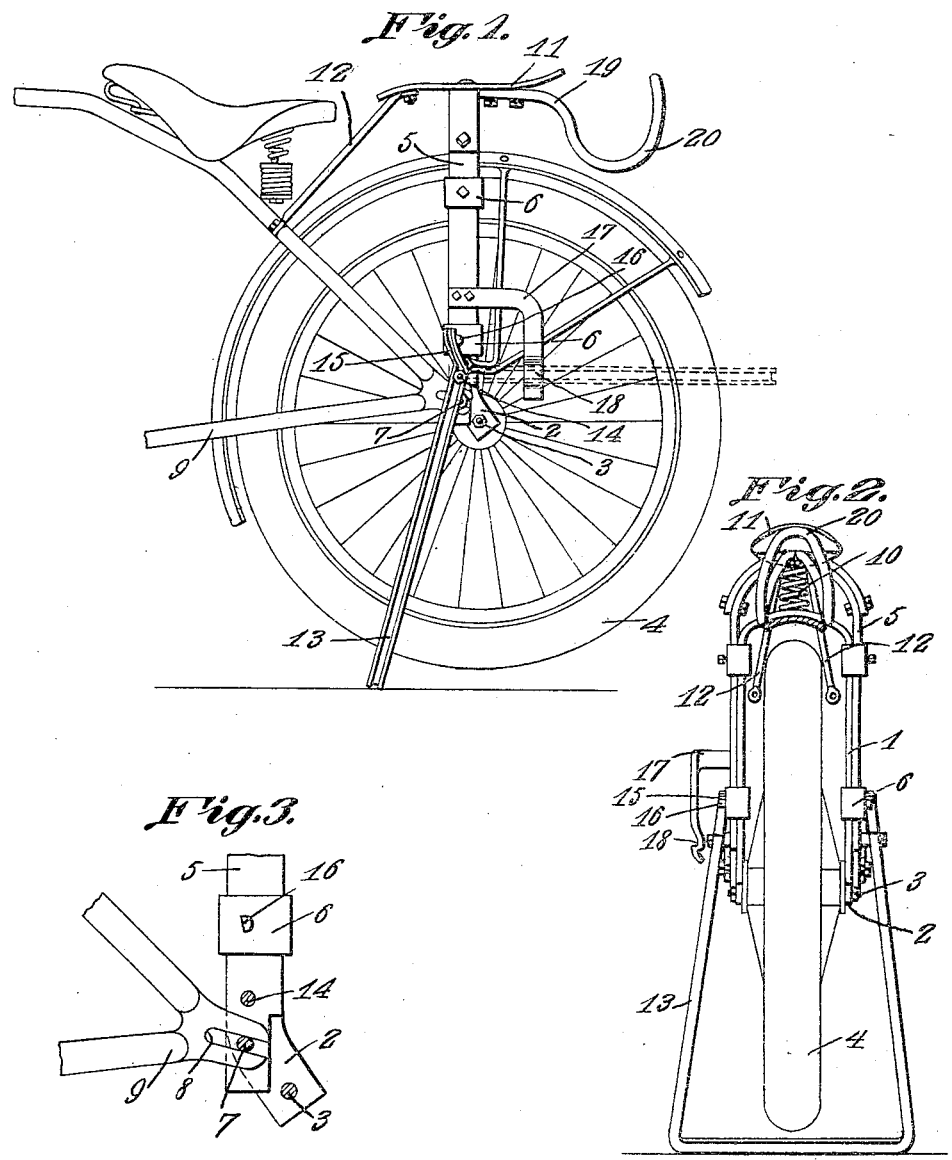

HOWARD H. SHUMAKER, OF MALVERN, ARKANSAS.

MOTOR-CYCLE ATTACHMENT.

1,251,297.  Specification of Letters Patent.  Patented Dec. 25, 1917.

Application filed July 25, 1917. Serial No. 182,757.

*To all whom it may concern:*

Be it known that I, HOWARD H. SHUMAKER, a citizen of the United States, residing at Malvern, in the county of Hot Spring and State of Arkansas, have invented a new and useful Motor-Cycle Attachment, of which the following is a specification.

The present invention relates to an attachment designed especially for use upon motorcycles, but which can also be used upon bicycles and other vehicles, it being the object of the invention to provide a novel and improved device for resiliently supporting the rear end of the frame from the rear wheel, to absorb shocks and render the riding smoother.

The invention has for its object the provision of an attachment of the nature indicated which is comparatively simple and inexpensive in construction, which can be readily applied, and which will effectively serve its purpose, the device also carrying a tandem seat for a passenger.

A further object of the invention is to combine with the attachment, the stand for the rear portion of the vehicle.

With the foregoing and other objects in view, which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

The invention is illustrated in the accompanying drawing, wherein:

Figure 1 is a side elevation of the rear portion of a motorcycle or bicycle showing the attachment applied.

Fig. 2 is an enlarged rear view of the device.

Fig. 3 is an enlarged detail view showing the portion of the device attached to the rear wheel axle and frame.

The device embodies an inverted U-shaped member or arch 1 standing astride the rear wheel 4, and having its lower terminals curved rearwardly, as at 2, and apertured to receive the axle 3 of the rear wheel, whereby said member 1 is supported by the rear axle.

A second inverted U-shaped member or arch 5 straddles or fits slidably upon the member 1 for vertical reciprocation, and guide members 6 are secured to the limbs of the member 5 and slidably embrace the limbs of the member 1, to guide said members for sliding movement longitudinally thereof. Bolts 7 or equivalent elements are attached to the lower terminals of the member 5 and are fitted within the slots 8 in the rear end of the frame 9, whereby when the bolts 7 are loosened, the members 5—1 can be adjusted back and forth with the rear wheel, for tightening or slacking the chain connected to the rear wheel. The terminals 2 of the member 1 being curved rearwardly permits the rear axle 3 to move vertically without interference with the member 5 or frame 9.

A coiled wire expansion spring 10 or other suitable spring is confined between the upper intermediate portions of the members 1 and 5, tending to separate them, whereby the member 5 is yieldably supported from the member 1, and the member 5 in supporting the rear end of the frame will, therefore, enable the rear end of the frame and rear wheel to vibrate relatively, for absorbing the shocks, the members 1 and 5 sliding relatively as the spring 10 is compressed and expanded.

A tandem seat 11 is preferably secured upon the upper portion of the member 5 to carry a passenger, it being noted that the seat 11 will be supported by the spring 10 to yield. The forward portion of the seat 11 is connected by braces or stays 12 with the frame, to hold the device in place.

The stand 13 for the rear wheel is of U-shape, and has its terminals pivoted by means of bolts 14 or other suitable pivots with the limbs of the member 5 immediately above the bolts 7. The terminals of the stand 13 have extensions 15 to strike stops 16 for limiting the movement of the parts when the stand is swung into supporting position, as seen in full lines in Fig. 1. These stops 16 may be the securing elements which fasten the lower guides 6 to the member 5. When the stand 13 is moved into supporting position, it supports the member 5 and consequently the frame 9, but the member 1 has only a limited downward movement within the member 5, so that the rear wheel 4 will be supported above the ground.

In order to hold the stand 13 when swung out of the way, as seen in dotted lines in Fig. 1, a leaf spring catch 17 is fastened to one limb of the member 5 and has a depending terminal provided with a bent portion 18 to snap into engagement with one limb of the stand 13 when it is swung upwardly.

A package carrier 19 is secured to the lower portion of the seat 11, when desired, and has its rear portion 20 extending downwardly, rearwardly and upwardly for holding a bundle or package.

The present attachment cannot only be used upon the rear wheel of a motorcycle, bicycle, or similar vehicle, but can also be used upon the front wheel with equal propriety and success.

Having thus described the invention, what is claimed as new is:

1. A device of the character described embodying a pair of inverted U-shaped slidably connected members for attachment to a vehicle wheel axle and frame, respectively, and spring means between said members.

2. A device of the character described embodying a pair of inverted U-shaped slidably connected members, one straddling the other, said members having means for attachment to a vehicle axle and frame, respectively, and an expansion spring between the intermediate portions of said members.

3. A device of the character described embodying inverted U-shaped slidably connected members, one straddling the other, the terminals of said members having means for engaging a vehicle wheel axle and frame, respectively, the terminals of one member extending away from the other, and spring means between said members.

4. A device of the character described embodying slidably connected inverted U-shaped members to engage a vehicle wheel axle and frame, respectively, spring means between said members, and a seat supported by one member.

5. A device of the character described, embodying a pair of members connected for relative vertical sliding movements, spring means between said members, said members having means for connection with a vehicle wheel axle and frame, respectively, and a stand connected to that member which has the means for the connection of the frame.

6. A device of the character described embodying a pair of inverted U-shaped slidably connected members having means at their terminals for connection with a vehicle wheel axle and frame, respectively, spring means between said members, a U-shaped stand pivoted at its terminals to one of said members, said stand and member having means for limiting the movement of the stand, and means for supporting the stand when swung upwardly.

In testimony that I claim the foregoing as my own, I have hereto affixed my signature in the presence of two witnesses.

HOWARD H. SHUMAKER.

Witnesses:
W. H. COOPER, Jr.,
A. E. ALDERSON.